United States Patent Office

Re. 27,541
Reissued Jan. 9, 1973

27,541

SILOXANE-OXYALKYLENE COPOLYMER FOAM STABILIZERS

Edward L. Morehouse, New City, N.Y., assignor to Union Carbide Corporation

No Drawing. Original No. 3,505,377, dated Apr. 7, 1970, Ser. No. 573,133, Aug. 12, 1966. Application for reissue No. 18, 1971, Ser. No. 200,242

Int. Cl. C07f 7/08

U.S. Cl. 260—448.2 B 6 Claims

Matter enclosed in heavy brackets [ ] appears in the original patent but forms no part of this reissue specification; matter printed in italics indicates the additions made by reissue.

ABSTRACT OF THE DISCLOSURE

Compounds of the formula $$\begin{array}{c} R(OC_2H_4)_n(OC_3H_6)_mOR' \\ | \\ Me_3SiO(Me_2SiO)_x(MeSiO)_ySiMe_3 \end{array}$$

useful as foam stabilizers for flexible polyurethane foams are disclosed. In the above formula $R^1$ is monovalent hydrocarbon, R is alkylene of at least 2 carbon atoms, the sum of m+n is such that the oxyalkylene block has a molecular weight of at least 1500, x is at least 40, and y is at least 3.

This invention relates to novel siloxane-oxyalkylene block copolymers and to the use of such copolymers as foam stabilizers for flexible polyurethane foams.

Flexible polyether urethane foams are conventionally prepared by a one step or "one shot" process which involves reacting a polyisocyanate with a polyether containing hydroxyl groups in the presence of water, a blowing agent, catalysts (e.g. tin catalysts) and a siloxane-oxyalkylene block copolymer foam stabilizer. Of these various materials, one of the more expensive on a pound for pound basis is the siloxane-oxyalkylene block copolymer. Accordingly, it is desirable from an economic standpoint to minimize the amount of the block copolymer employed while retaining good foam quality.

In producing such foams, it is also desirable to control the formation of closed cells as an excess of closed cells impairs the breathability of the foam.

Over the past several years, a variety of siloxane-oxyalkylene block copolymers have been proposed as foam stabilizers for the production of flexible polyurethane foam. The first variety had a silicon to oxygen to carbon linkage between the siloxane and oxyalkylene blocks. This linkage is hydrolytically unstable to some extent and so later varieties of block copolymers were characterized by a more stable silicon to carbon linkage between the blocks. However, even the most recent varieties of block copolymers proposed are not entirely satisfactory. Thus some require relatively unavailable starting materials (e.g. dimethylchlorosilane). Other block copolymer foam stabilizers must be used in relatively large amounts and are consequently costly. Still others, although allegedly hydrolytically stable, undergo some change when premixed with water and stored for prolonged periods with the result that the foams produced contain excessive closed cells and, consequently, poor breathability. Yet other block copolymer foam stabilizers have poor "tin operating latitude" (i.e., they produce foams having poor breathability when used with normal concentrations of tin catalysts and, when the tin catalyst concentration is lowered to improve the breathability of the foam, the foam becomes weak and contains splits).

It is an object of this invention to provide siloxaneoxyalkylene block copolymers which can be produced from readily available starting materials, which have good "tin operating latitude" and which can be employed, even after admixing with water and prolonged storage, in relatively small amounts to produce breathable flexible polyurethane foam.

Other objects of this invention will be apparent from the following description.

This invention provides siloxane-oxyalkylene block copolymers represented by the formula:

$$\begin{array}{c} R'O(C_3H_6O)_m(C_2H_4O)_nR \\ | \\ Me_3SiO(Me_2SiO)_x(MeSiO)_ySiMe_3 \end{array} \qquad (A$$

wherein R′ is a monovalent hydrocarbon group containing from 1 to 10 carbon atoms (preferably an alkyl group containing from 1 to 4 carbon atoms inclusive), R is an alkylene group containing at least 2 carbon atoms and up to 4 or more carbon atoms (preferably containing 3 carbon atoms), m and n are numbers, the sum of m+n is such that the oxyalkylene block, $$R'O(C_3H_6O)_m(C_2H_4O)_n$$

has a molecular weight of at least 1500, from 15 to 60 weight percent of the oxyalkylene units are oxyethylene units, x has a value of at least 40 (preferably at least 50 or 70), and can have a value up to 200 (preferably up to 125 or 150), y has a value of at least 3 (preferably from 4 to 15), the siloxane block constitutes from 15 to 70 weight percent of the block copolymer, and Me is a methyl group.

Typical of the groups represented by R′ in Formula A are the alkyl groups (e.g. the methyl, ethyl, propyl and butyl groups), the aryl groups (e.g. the phenyl and tolyl groups) and the aralkyl groups (e.g. the benzyl and beta-phenylethyl groups). Typical of the groups represented by R in Formula A are the ethylene, propylene, butylene and amylene groups.

This invention also provides a process for producing a flexible polyurethane foam which comprises reacting and foaming a reaction mixture of:

(I) A polyether [or a polyester] containing an average of at least two hydroxyl groups per molecule;

(II) A polyisocyanate containing at least two isocyanato groups per molecule, said polyether [or polyester] and said polyisocyanate taken together, being present in the mixture in a major amount and said polyether [or polyester] and polyisocyanate being present in the mixture in the relative amount required to produce the polyurethane foam;

(III) A blowing agent in a minor amount sufficient to foam the mixture;

(IV) A catalytic amount of a catalyst for the reaction of the polyether [or polyester] and the polyisocyanate to produce the polyurethane; and (V) A foam stabilizing amount of a siloxane-oxyalkylene block copolymer represented by Formula A above.

The siloxane-oxyalkylene block copolymers of this invention are readily produced by the well known processes, e.g. by an addition reaction between a siloxane having SiH groups and an alkenyl end-blocked oxyalkylene polymer (polyether). The reaction is conducted by heating the reactants in the presence of a platinum catalyst (e.g. finely divided elemental platinum supported on alumina or charcoal or chloroplatinic acid).

[The polyesters employed in this invention to produce polyester polyurethane foams are the reaction products of polyfunctional organic carboxylic acids and polyhydric alcohols. The polyesters contain at least two hydroxyl groups per molecule (as alcoholic OH or as OH in COOH groups). The polyesters can have hydroxyl numbers from 45 to 150 but preferably have hydroxyl numbers from 45 to 65. These hydroxyl numbers are readily determined according to the procedure described by Mitchel et al., Organic Analysis, volume I, Interscience, New York, 1953. The polyesters can be free of aliphatic carbon to carbon multiple bonds (i.e. olefinic double bonds or acetylenic triple bonds).]

[Typical of the polyfunctional organic carboxylic acids that can be employed in producing polyesters useful in this invention are dicarboxylic aliphatic acids such as succinic, adipic, sebacic, azelaic, glutaric, pimelic and suberic acids and aromatic dicarboxylic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyesters.

Typical of the polyhydric alcohols ("polyols") that can be employed in producing the polyesters useful in this invention are both the monomeric polyhydric alcohols (such as glycerol, 1,2,6-hexanetriol, ethylene glycol, trimethylolpropane, trimethylolethane, pentaerythritol, propylene glycol, 1,3-butylene glycol and 1,4-butylene glycol) and the polymeric polyhydric alcohols ("polyethers") such as those described below.

The polymeric polyhydric alcohols employed in producing the polyesters used in this invention]. *The polyethers employed in this invention to produce polyether polyurethane foams* include the linear and branched chain polyethers which have a plurality of acyclic ether oxygens and contain at least two alcoholic hydroxyl radicals. Illustrative polyethers include the polyoxyalkylene polyols containing one or more chains of connected oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide, and 1,4-butylene oxide.

Other acyclic and alicyclic polyols which can be reacted with ethylene oxide, propylene oxide, butylene oxide or mixtures thereof to provide polyethers that are [useful in producing polyesters] used in this invention include glycerol, trimethylolpropane, 1,2,6-hexanetriol, pentaerythritol, sorbitol, glycosides, such as methyl, ethyl, propyl, butyl and 2-ethylhexyl arabinoside, xyloside, fructoside, glucoside and rhammoside, and polyethers prepared by the reaction of alkylene oxides with sucrose.

Further polyethers that are [useful in producing polyesters that can be] used in this invention are prepared by reacting a 1,2-alkylene oxide such as ethylene oxide, propylene oxide, butylene oxide or mixtures thereof with mononuclear polyhydroxybenzenes such as resorcinol, pyrogallol, phloroglucinol, hydroquinone, 4,6-di-t.-butylcatechol or catechol. Other polyethers which can be [employed in producing polyesters that can be] used in this invention are those obtained by reacting 1,2-alkylene oxides or mixtures thereof with polynuclear hydroxybenzenes such as the various di-, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound. Exemplary diphenylol compounds include 2,2-bis(p-hydroxyphenyl)-propane; bis(p-hydroxyphenyl)-methane and the various diphenols and diphenylol methanes disclosed in United States Patents Nos. 2,506,486 and 2,744,882, respectively. Tetraphenylol compounds can also be reacted with 1,2-alkylene oxides to produce polyethers that [are useful in producing polyesters that] can be used in this invention. Other polyethers which can be employed in [producing polyesters that can be used in] this invention are the ethylene oxide, propylene oxide and butylene oxide adducts of phenolformaldehyde condensation product materials such as the novolaks.

[The polyethers employed in this invention to produce polyether urethane foam include the polyethers described above as reactants for making polyesters.]

A variety of organic polyisocyanates can be employed in this invention for reaction with the [polyesters or] polyethers above-described to produce polyurethane foams. Preferred are polyisocyanates having the general formula:

$$Q(NCO)_i$$

wherein i is an integer of two or more and Q is an organic radical having the valence of i. Q can be substituted or unsubstituted hydrocarbon group (e.g. an alkylene or an arylene group). Q can be a group having the formula Q'—Z—Q' where Q' is an alkylene or arylene group and Z is —O—, —O—Q'—O—, —CO—, —S—, —S—Q'—S—, or —$SO_2$—. Examples of such compounds include hexamethylene diisocyanate, 1,8-diisocyanato, p-methyl, xylylene diisocyanate, $$(OCNCH_2CH_2CH_2OCH_2)_2$$

1-methyl-2,4-diisocyanato-cyclohexane, phenylene diisocyanates, tolylene diisocyanates, chlorophenylene diisocyanates, diphenylmethane - 4,4' - diisocyanate, naphthalene - 1,5-diisocyanate, triphenylmethane-4,4',4''-triisocyanate, and isopropylbenzene-alpha-4-diisocyanate. Further included among the isocyanates useful in this invention are dimers and trimers of isocyanates and diisocyanates and polymeric diisocyanates such as those having the general formula:

$$[Q(NCO)_i]_j$$

in which i and j are integers of two or more, as well as (as additional components in the reaction mixtures) compounds of the general formula $$L(NCO)_i$$

in which i is one or more and L is a monofunctional or polyfunctional atom or radical. Examples of this type include ethylphosphonic diisocyanate, $$C_2H_5P(O)(NCO)_2$$

phenylphosphonic diisocyanate, $C_6H_5P(O)(NCO)_2$; compounds containing a =Si—NCO group, isocyanates derived from sulfonamides ($QSO_2NCO$), cyanic acid, thiocyanic acid, and compounds containing a metal —NCO radical such as tributyltin isocyanate.

The polyisocyanates are preferably employed in this invention in amounts that provide from 90% to 110% of the stoichiometric amount of isocyanato groups required to react with all of the hydroxyl groups of the [polyester or] polyether and with any water present as a blowing agent.

The blowing agents employed in this invention include water, methylene chloride, liquefied gases which have boiling points below 80° F. and about −60° F., or by other inert gases such as nitrogen, carbon dioxide, methane, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1 - chloro - 1 - fluoroethane, 1-chloro-1,1-difluoro, 2,2-dichloroethane, and 1,1,1-trifluoro, 2-chloro-2-fluoro, 3,3-difluoro - 4,4,4 - trifluorobutane. The amount of blowing agent used will vary with density desired in the foamed product. [Usually from 2 to 15 parts by weight of the blowing agent per 100 parts by weight of the polyester are preferred.]

Other additional ingredients can be employed in minor amounts in producing polyurethane foams in accordance with the process of this invention if desired for specific purposes. Thus, inhibitors (e.g. d-tartaric acid and tertiarybutyl pyrocatechol, "Ionol") can be employed to reduce any tendency of the foam to hydrolytic or oxidative instability. [Compounds containing both secondary and tertiary hydroxyl groups, such as "hexylene glycol" [i.e. 2-methyl-2,4-pentanediol], can be used to further reduce compression set and to solubilize amine catalysts. Fatty acids, such as those in tall oil (a by-product from the digestive process of fine wood chips composed of fatty acids, rosin acids and polymerized, unsaponifiable hydrocarbons), can be employed to solubilize insoluble amine catalysts. Paraffin oil can be added to regulate cell structure so as to coarsen cells and thereby further reduce the tendency of the foam to split.] Other additives that can be employed are dyes or pigment and anti-yellowing agents.

[In producing polyester polyurethane foams in accordance with this invention, conventional organic surfactants ("emulsifiers") can be employed in combination with the siloxane-oxyalkylene block copolymer as foam stabilizers. Such organic surfactants include liquid, water-insoluble organic compounds having at least 18 carbon atoms and at least one carbon-bonded sulfonic acid group represented by the formula:

$$-SO_3H$$

or at least one ammonium, alkali metal or alkyaline earth metal salt group derived from said sulfonic acid group. The sulfonic acid groups or salt derivatives thereof can be substituents on any of a wide variety of "backbone" organic compounds provided such compounds have at least 18 carbon atoms and are water-insoluble liquids. Preferably, such groups are substituents on hydrocarbons (on a mixture of hydrocarbons), fatty acid esters or hydrocarbons having polyalkylene oxide substituents. The sulfonic surfactants can have viscosities up to about 1,400 SUS at 210° F. or higher. Suitable sulfonic surfactants include "Witco Formez 77–86" and "Emcol H–77." Preferred sulfonic surfactants are liquid, water-insoluble materials having the formula:

$$[R^{\circ}SO_3]_mM$$

wherein R° is a monovalent hydrocarbon group having at least 18 carbon atoms, M is a cation selected from the group consisting of the hydrogen, $NR^{\circ\circ}{}_4$, alkali metal and alkaline earth metal cations, R°° is hydrogen or a monovalent hydrocarbon group, and m is the valence of the cation represented by M. The sulfonic surfactants represented by Formula 1a include hydrocarbyl sulfonic acids and the ammonium, quaternary ammonium, alkali metal and alkaline earth metal salts thereof. Surfactants of the latter type are described in "Bryton Sulfonates," 1962, Bryton Chemical Company, 50–BR4–762.]

Conventional polyurethane-foaming catalysts are employed in this invention. [Thus, in the case of polyester polyurethane foams, useful catalysts include N-methyl morpholine, N-ethyl morpholine, hexadecyl dimethylamine, dimethyl benzyl amine, and N-cocomorpholine and the like. Such catalysts are preferably employed in an amount from 0.1 to 0.5 or 2 weight percent based on the total weight of the polyester and the polyisocyanate. Amines are preferred. In the case of polyether polyurethane foams, useful.] *Useful* catalysts include amines and a wide variety of metal compounds, both inorganic metal compounds and metal compounds which contain organic groups. Particularly useful catalysts are tertiary amines and organo-tin compounds. All of the above catalysts can be used alone or in mixtures with one or more of the other such catalysts. Among the organo-tin compounds that deserve particular mention as catalysts in producing polyether polyurethane foams in accordance with this invention are stannous acylates such as stannous acetate, stannous octoate, stannous laurate, stannous oleate and the like; stannous alkoxides such as stannous butoxide, stannous 2-ethylhexoxide, stannous phenoxide, o- m- and p-stannous cresoxodies, and the like; dialkyl tin salts of carboxylic acids, e.g., dibutyltin diacetate, dibutyltin dilaurate, dibutyltin maleate, dilauryltin diacetate, dioctyltin diacetate, and the like. The tertiary amines which are useful as catalysts in producing polyether polyurethan foams in accordance with this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine and N-octadecylmorpholine (N-cocomorpholine). Typical tertiary amines containing active hydrogen atoms reactive with isocyanate groups include dimethylethanolamine, triethanolamine, triisopropanolamine and N-methyldiethanolamine. Other suitable catalysts include metal organic compounds of lead, arsenic, antimony, and bismuth compounds characterized by the presence therein of a direct carbon-to-metal bond; organic halides of titanium; the inorganic halides of tetravalent tin, arsenic, antimony, bismuth and titanium; polystannates; tin, titanium and copper chelates; and mercury salts. In general, the amount of each catalyst employed is preferably between about .2 and about 1.0 part by weight per 100 parts by weight of polyether [or polyester].

The amount of the siloxane-oxyalkylene block copolymer employed as a foam stabilizer in this invention can vary over wide limits. Thus from about 0.2 weight percent to 10 weight percent or greater of the block copolymers can be used (weight percentages are based on the total weight of the foam formulation, that is, the polyether [or polyester], isocyanate, catalyst, blowing agent and foam stabilizer). There is no commensurate advantage to using amounts of foam stabilizer greater than about 10 weight percent. Preferably, the amount of siloxane-oxyalkylene block copolymer present in the foam formulations varies from about 0.5 weight percent to about 2.0 weight percent.

As is apparent from the foregoing description, the relative amounts of the various components reacted in accordance with the above-described process for producing flexible [polyester or] polyether, polyurethane/foams in accordance with this invention are not narrowly critical. The [polyester or] polyether are the polyisocyanate, taken together, are present in the foam formulations (reaction mixtures) used to produce such foams in a major amount. The relative amounts of these two components is the amount required to produce the urethane structure of the foam and such relative amounts are well known in the art. The blowing agent, catalyst and surfactants are each present in the known amount necessary to achieve the function of the component. Thus, the blowing agent is present in a minor amount sufficient to foam the reaction mixture, the catalyst is present in a catalytic amount (i.e. an amount sufficient to catalyze the reaction to produce the urethane at a reasonable rate) and the novel block copolymer surfactants are present in a foam-stabilizing amount (i.e. in an amount sufficient to stabilize the foam).

Polyurethane foams are produced in accordance with this invention by the conventional one-shot or one-step process. Typically this process comprises (1) combining at a temperature between about 15° C. and about 50° C. separate mixtures comprising (i) a polyether [or polyester], the siloxane-oxyalkylene block copolymer, a catalyst and blowing agent, and (ii) an organic isocyanate (or mixture of organic isocyanate) and (2) maintaining the combined mixture at a temperature between about 15° C. and about 50° C. until the foaming reaction commences, (3) pouring the foaming reaction mixture into a suitable mold maintained at between about 15° C. and about 50° C., and (4) curing the resulting foam by heating the foam at a temperature between about 100° C. and about 150° C.

The heating step (4) described in the preceding paragraph is not essential, but heating cures the foamed product to a stable, tack-free, resin foam capable of supporting a load within a relatively short period of time (in the order of about five minutes to thirty minutes), whereas longer times are required to obtain a cured, tack-free resin at room temperature. Also, the pouring step (3) is not essential since the mixtures (i) and (ii) can be combined and the foaming reaction commenced and completed in a mold.

The siloxane-oxyalkylene block copolymers of this invention are remarkably more "potent" than various other siloxane-oxyalkylene block copolymer, including commercially available block copolymers. That is, a lesser amount of the novel copolymers is required to stabilize polyurethane foam. Accordingly, economic advantages result from the use of the novel block copolymer. This superiority is surprising in view of the teachings of the art that, among block copolymers having the general "linear" structure of Formula A above, those having 6 to 30 dimethylsiloxane units are preferred (the novel block copolymer of this invention have a minimum of 40 of such units).

In addition, the block copolymers of this invention can be admixed with water and stored for prolonged periods and then used as foam stabilizers to produce breathable flexible, polyether polyurethane foam. This cannot be done with certain known "hydrolytically stable" siloxaneoxyalkylene block copolymers. Further, the novel block copolymers are produced from readily available silanes and have god "tin operating latitude."

Still further, the novel block copolymers provides for processing advantages in the production of polyurethane foam in that they allow for the use of a lower viscosity surfactant system. Current processes involve the pumping of a standard volume of a block copolymer surfactant and, the more viscous the surfactant, the more difficult is the pumping operation. It is not feasible to dilute the conventional viscous copolymers with a solvent to produce a lower viscosity solution since this would require the handling and pumping of undesirably large and non-standard volumes of liquids. However, the novel block copolymers of this invention, due to their greater potency, can be diluted with solvents to produce relatively low viscosity solutions of standard volume and the same effectiveness as conventional surfactans. Suitable solvents are organic liquids in which the block copolymers are soluble. Such liquids are of lower viscosity than the block copolymer (e.g. they have viscosities less than 900 centistokes at 15° C.). These liquids are desirably of low volatility to minimize fire hazards (e.g. they should have boiling points greater than 150° C. at atmospheric pressure). The solvents are preferably water-soluble to permit premixing the solvent-copolymer solution with the water often used in making the foam. These solvent-copolymer solutions can also be pre-mixed with the polyether (polyol), catalysts or organic blowing agent. Suitable solvents include ethers, esters, hydrocarbons and halohydrocarbons. Preferred liquids are compounds having the formula:

$$ZO(Z'O)_tZ''$$

wherein Z is hydrogen or a monovalent hydrocarbon group (e.g. alkyl such as methyl and ethyl, aryl such as phenyl and tolyl, aralkyl such as benzyl, or alkenyl such as vinyl), Z' is an alkylene group (e.g. an ethylene, propylene, butylene, amylene or octylene group), Z'' is a monovalent hydrocarbon group such as defined for Z and t has a value of at least 2. When Z is hydrogen, it is preferred that the ZO(HO) group represent no more than 5 weight percent of the solvent. Preferably some or all of the groups represented by Z'O are ethyleneoxy groups to impart water solubility to the solvent. The copolymer-solvent solutions preferably contain from 25 to 75 parts by weight of the copolymer per 100 parts by weight of the solvent and the copolymer but can contain from 1 to 99 parts of the copolymer. Such copolymer-solvent solutions can also contain small amounts of organic surfactants (e.g. $C_9H_{19}C_6H_4(OC_2H_4)_{14.5}OH$) to raise the cloud point of aqueous solutions produced by mixing the copolymer-solvent solution with water.

The flexible polyurethane oams produced in accordance with this invention can be used [in the same areas and for the same purposes as conventional flexible ester urethane foams (e.g. they can be used] as cushioning materials for seating and for packaging delicate objects, *and* as gasketing material [and, in the case of foams produced from polyesters, as textile interliners)].

The following examples illustrate the present invention.

In the examples appearing below, copolymers A to W are copolymers of this invention within the scope of Formula A above whereas Copolymers I to VI are other siloxane - oxyalkylene copolymers (e.g., commercially available copolymers) used for purposes of comparison. "Me" is used to denote the methyl group.

Examples I to III illustrate the preparation of the block copolymers of this invention.

EXAMPLE I

A silicone fluid of average composition $$Me_3SiO(Me_2SiO)_{72}(MeHSiO)_{5.1}SiMe_3$$

(48.5 grams, 0.043 mole of SiH), an allyl-end-blocked polyether of average composition $$MeO(CHMeCH_2O)_{29}CH_2CH_2O)_{20}CH_2CH{=}CH_2$$

(143 grams, 0.047 mole of allyl), toluene (94 milliliters) and chloroplatinic acid (25 parts per million as Pt) were stirred and heated to 85° C. The reaction mixture became clear and only a trace of residual silanic hydrogen could be detected. Sodium bicarbonate (2 grams) was added and the mixture sparged with nitrogen at 130° C. and filtered. The copolymer obtained was a clear liquid with a viscosity of 25° C. of 3420 centistokes. The average composition of the surfactant (Copolymer A) was $$Me_3SiO(Me_2SiO)_{72}[MeO(CHMeCH_2O)_{29}(CH_2CH_2O)_{20}C_3H_6\overset{Me}{\underset{|}{Si}}O{-}]_{5.1}SiMe_3$$

EXAMPLE II

A solution of a hydrosiloxane of average composition $$Me_3SiO(Me_2SiO)_{75}(MeHSiO)_{12.4}SiMe_3$$

(37.9 grams, 0.072 mole of SiH) and toluene (86 g.) was heated to 70° C. in a 500 milliliter flask equipped with stirrer, thermometer, dropping funnel, heating mantle and condenser. Chloroplatinic acid catalyst (25 parts per million Pt) was added. A polyether of average composition $$MeO(CHMeCCH_2O)_{15}(CH_2CH_2O)_{19}CH_2CH{=}CH_2$$

(162 grams, 0.080 mole of allyl) was added dropwise at a rate such that the reaction mixture remained essentially clear throughout the addition. After all of the polyether had been added only a trace of residual silanic hydrogen could be detected. Sodium bicarbonate (1.0 gram) was added and the mixture sparged with nitrogen at 130° C. and filtered. The copolymer obtained was a clear liquid with a viscosity at 25° C. of 1390 centistokes. The average composition for this surfactant (Copolymer B) was $$MeSiO(MeSiO)_{75}[MeO(CHMeCH_2O)_{15}(CH_2CH_2O)_{219}C_3H_6\overset{\overset{Me}{|}}{\underset{\underset{|}{}}{Si}}O-]_{12.4}SiMe_3$$

EXAMPLE III

Using the procedure of Example I surfactants of this invention were prepared which had the following compositions:

Generic formula $$Me_3SiO(Me_2SiO)_x[MeO(\overset{\overset{Me}{|}}{CH}CH_2O)_m(CH_2CH_2O)_nC_3H_6\overset{\overset{Me}{|}}{\underset{\underset{|}{}}{Si}}O]_ySiMe_3$$

| Copolymer | x | y | m(PO)[1] | n(EO)[2] | Viscosity cstk., at 25° C. |
|---|---|---|---|---|---|
| C | 87 | 6.7 | 29 | 20 | 3,060 |
| D | 75 | 12.4 | 17 | 12 | 870 |
| E | 73 | 4.1 | 29 | 20 | 4,000 |
| F | 69 | 9.1 | 29 | 20 | 1,670 |
| G | 71 | 9.1 | 39 | 17 | 1,280 |
| H | 71 | 6.7 | 30 | 29 | 3,610 |
| HH | 73 | 4.1 | 30 | 29 | 9,200 |
| J | 71 | 6.7 | 34 | 24 | 1,930 |
| K | 75 | 12.4 | 19 | 18 | 1,240 |
| L | 71 | 6.7 | 22 | 21 | 2,640 |
| M | 72 | 5.1 | 29 | 20 | 2,501 |
| N | 87 | 6.5 | 29 | 20 | 3,210 |
| O | 73 | 4.0 | 29 | 20 | 4,340 |
| P | 88 | 5.7 | 29 | 20 | 4,750 |
| Q | 42 | 3.6 | 29 | 20 | 1,620 |
| R | 48 | 4.2 | 29 | 20 | 1,700 |
| S | 49 | 3.7 | 29 | 20 | 2,100 |
| T | 125 | 9.1 | 29 | 20 | 4,540 |

[1] PO denotes proplyene oxide units.
[2] EO denotes ethylene oxide units.

Also using the procedure of Example I, two additional copolymers of this invention having the following formulae were prepared:

$$Me_3SiO(Me_2SiO)_{75}[C_6H_5CH_2O(C_3H_6O)_{14}(C_2H_4O)_{19}C_3H_6\overset{\overset{Me}{|}}{\underset{\underset{|}{}}{Si}}O-]_{12.4}SiMe_3$$

$$Me_3SiO(Me_2SiO)_{63}[C_4H_9O(C_3H_6O)_{14}(C_2H_4O)_{19}C_3H_6\overset{\overset{Me}{|}}{\underset{\underset{|}{}}{Si}}O-]_{10.0}SiMe_3$$

Examples IV to IX illustrate the production of flexible polyether polyurethane foam in accordance with the process of this invention. In all cases, conventional mixing, foaming and curing procedures were used. In brief, the reactants were mixed and then the foaming and urethane forming reactions occurred without the application of external heat. Generally, the block copolymer and the polyether( polyol) were mixed first. To this mixture was added the water and amine catalyst(s) and then the fluorocarbon blowing agent was added. The mixture so formed was stirred for 15 seconds and then the tin catalyst was added and the mixture was again stirred for 8 seconds. Finally the polyisocyanate was added and the reaction mixture was poured into a box. Modifications of this mixing sequence are shown in the examples. Thereupon the foam was cured by heating an an oven for 15 minutes at 130° C. The performance of the novel copolymers as compared with the performance of other copolymers as foam stabilizers is shown in the tables presented below.

For the sake of brevity, the following abbreviations and terms are used to describe the quality of the foams produced in the examples:

"CPI" is used for "cells per inch." This denotes the number of cells per linear inch of the foam. CPI is directly proportional to the fineness of the cell structure.

"Rise" denotes the foam height. Rise is directly proportional to surfactant potency.

"Top Collapse" denotes the difference in height between the initial maximum height of the foaming reaction mixture and the final (lower) height of the cured foam.

EXAMPLE IV

Flexible polyether polyurethane foams were prepared from the following materials:

| Material: | Parts by weight |
|---|---|
| Polyether having a hydroxyl number of 56 produced by reacting glycerol and propylene oxide | 100 |
| Triethylene diamine | 0.1 |
| N-ethylmorpholine | 0.2 |
| Water | 3.5 |
| Stannous octoate | 0.4 |
| Siloxane-oxyalkylene block copolymer as shown in Table I | 0.38 |
| $CFCl_3$ | 8.0 |
| Tolylene diisocyanate | 43.1 |

The copolymers used and the properties of the foams produced are shown in Table I.

TABLE I

| Copolymer | x (number of $Me_2SiO$ units) | y (number of polyether chains) | Subscripts in formula in Example III | | Foam properties | | |
|---|---|---|---|---|---|---|---|
| | | | m (PO) | n (EO) | Rise (inches) | Top collapse (inches) | CPI |
| I*[1] | 19 | 3 | 15 | 19 | 2.3 | 4.5 | ---------- |
| II* | 20 | 3.2 | 17 | 12 | 2.8 | 4.6 | ---------- |
| D | 75 | 12.4 | 17 | 12 | 6.8 | 1.1 | 30–35 |
| III* | 23 | 2.1 | 34 | 24 | 6.8 | 1.0 | 35 |
| J | 71 | 6.7 | 34 | 24 | 7.5 | 0.5 | 35 |
| IV* | 20 | 3.2 | 19 | 18 | 2.2 | 4.3 | ---------- |
| K | 75 | 12.4 | 19 | 18 | 7.5 | 0.2 | 35 |
| [V*] | [23] | [2.1] | [22] | [21] | [3.3] | [3.8 | ----------] |
| L | 71 | 6.7 | 22 | 21 | 7.7 | 0.7 | 35 |
| M | 72 | 5.1 | 29 | 20 | 8.2 | 1.0 | 30–35 |

*Shown for purposes of comparison, not a copolymer of this invention.
[1] Commercially available "hydrolyzable" siloxane-oxyalkylene block copolymer polyurethane foam surfactant.

EXAMPLE V

Flexible polyether polyurethane foams were prepared from the following materials:

| Material: | Parts by weight |
|---|---|
| Polyether having a hydroxyl number of 56 produced by reacting glycerol and propylene oxide | 100.0 |
| N,N,N',N'-tetramethyl-1,3-butanediamine | 0.1 |
| N-ethylmorpholine | 0.2 |
| Stannous octoate | 0.3 |
| Water | 4.0 |
| Siloxane-oxyalkylene block copolymer as shown in Table II (0.6 part by weight used for Copolymers IV and D) | 0.3 |
| Tolylene diisocyanate | 49.5 |

In all cases the block copolymer was premixed with the water prior to forming the reaction mixture with the remaining materials indicated above. The copolymers used and the properties of the foams produced are shown in Table II.

TABLE II

| Copolymer | x (number of $Me_2SiO$ units) | y (number of polyether chains) | Subscripts in formula in Example III | | Foam properties | | |
|---|---|---|---|---|---|---|---|
| | | | m (PO) | n (EO) | Rise (inches) | Top collapse (inches) | CPI |
| I* | 19 | 3 | 15 | 19 | 4.0 | ---------- | 20-25 |
| [III*] | [18] | [2.7] | [15] | [19] | [4.5 | ----------] | |
| IV*[2] | 20 | 3.2 | 17 | 12 | 3.5 | 3.6 | ---------- |
| D[2] | 75 | 12.4 | 17 | 12 | 6.3 | 0.7 | 40 |
| V* | 23 | 2.1 | 34 | 24 | 5.8 | 1.0 | 30 |
| J | 71 | 6.7 | 34 | 24 | 7.1 | 0.4 | 30-35 |
| VI* | 20 | 3.2 | 19 | 18 | 6.1 | 0.7 | 30-35 |
| K | 72 | 12.4 | 19 | 18 | 6.5 | 0.7 | 35-40 |
| [VII*] | [23] | [2.1] | [22] | [21] | [6.4] | [0.5] | [10-15] |
| L | 71 | 6.7 | 22 | 21 | 7.1 | 0.4 | 25-30 |
| M | 72 | 5.1 | 29 | 20 | 7.1 | 0.6 | 30-35 |

*Shown for purposes of comparison; not a copolymer of this invention.
[[1] Commercially available "non-hydrolyzable" copolymer having an acyloxy end-blocking group in the oxyalkylene block.]
[2] 0.6 Part by weight.

EXAMPLE VI

Flexible polyether polyurethane foams were prepared from the materials indicated in Example V using the copolymers shown in Table III below. Copolymer I was used in an amount of 0.3 part by weight. The other copolymers were used in an amount of 0.22 part by weight. The amounts of the other materials were as in Example V. Table III also shows the properties of the resulting foams.

TABLE III

| Copolymer | x (number of $Me_2SiO$ units) | y (number of polyether chains) | Subscripts in formula in Example III | | Foam properties | | |
|---|---|---|---|---|---|---|---|
| | | | m (PO) | n (EO) | Rise (inches) | Top collapse (inches) | CPI |
| I* | 19 | 3 | 15 | 19 | 2.0 | 3.6 | ---------- |
| V* | 36 | 3.1 | 29 | 20 | 6.8 | 0.6 | 20-25 |
| Q | 42 | 3.6 | 29 | 20 | 7.0 | 0.5 | 25-30 |
| R | 48 | 4.2 | 29 | 20 | 7.1 | 0.4 | 25-30 |
| S | 49 | 3.7 | 29 | 20 | 7.2 | 0.5 | 25-30 |
| M | 72 | 5.1 | 29 | 20 | 7.2 | 0.5 | 25-30 |
| N | 87 | 6.5 | 29 | 20 | 7.4 | 0.4 | 30-35 |

*Shown for comparison only; not a copolymer of this invention.

The data in Table III illustrates that, although copolymers of this invention having between 40 and 50 dimethylsiloxane units are more potent than the commercially available copolymer even at markedly lower concentrations, still better results are obtained with those copolymers having a least 70 such units.

EXAMPLE VII

Polyurethane foams were prepared from the materials indicated in Example IV using the copolymers shown in Table IV below. Copolymer I was used as such in an amount of 0.38 part by weight. The other copolymers were employed as 60 wt. percent solutions which were used in an amount of 0.35 part by weight. (Hence $0.35 \times 0.60 = 0.21$ part by weight of these copolymers were used). The amount of stannous octoate used was 0.35 part by weight. The amounts of the other materials were as in Example IV. In all cases, the copolymer or copolymer solution was premixed with the polyether before forming the reaction mixture. Table IV also shows the properties of the foams produced.

TABLE IV

| Copolymer | x (number of $Me_2SiO$ units) | y (number of polyether chains) | Subscripts in formula in Example III | | Foam properties | | |
|---|---|---|---|---|---|---|---|
| | | | m (PO) | n (EO) | Rise (inches) | Top collapse (inches) | CPI |
| I* | 19 | 3 | 15 | 19 | 2.3 | 4.5 | ---------- |
| V*[1] | 36 | 3.1 | 29 | 20 | 7.3 | 0.7 | 32 |
| U[2] | 72 | 5.1 | 29 | 20 | 7.7 | 0.6 | 34 |
| O[1] | 73 | 4.0 | 29 | 20 | 7.2 | 0.6 | 38 |
| C[1] | 87 | 6.7 | 29 | 20 | 7.7 | 0.3 | 34 |
| P[1] | 88 | 5.7 | 29 | 20 | 7.8 | 0.3 | 36 |
| T[2] | 125 | 9.1 | 29 | 20 | 7.6 | 0.5 | 36 |

*Shown for comparison only; not a copolymer of this invention.
[1] Copolymer in solution containing 60 wt. percent copolymer and 40 wt. percent $HO(C_2H_4O)_{19}(C_3H_6O)_{14}C_4H_9$.
[2] Copolymer in solution containing 60 wt. percent copolymer, 36 wt. percent $HO(C_2H_4O)_{19}(C_3H_6O)_{14}C_4H_9$ and 4 wt. percent $C_9H_{19}C_6H_4(OC_2H_4)_{14.5}OH$.

The results in Table IV illustrate that the copolymers of this invention are considerably more potent, even at markedly lower concentrations, than the commercially available copolymer. The results also illustrate that the novel copolymers are superior to a seemingly similar copolymer having fewer dimethylsiloxane units.

EXAMPLE VIII

Polyurethane foams were prepared from the materials indicated in Example IV using the copolymers shown in Table V below. Copolymer V, the 60 wt. percent copolymer solutions and the stannous octoate were each used in an amount of 0.35 part by weight. Accordingly, the copolymers added as solutions were used in the amount of 0.21 part by weight ($0.35 \times .6 = 0.21$). The amounts of the other materials were as indicated in Example IV. Table V also shows the properties of the foams produced.

TABLE V

| Copolymer | x (number of $Me_2SiO$ units) | y (number of polyether chains) | Subscripts in formula in Example III | | Foam properties | | |
|---|---|---|---|---|---|---|---|
| | | | m (PO) | n (EO) | Rise (inches) | Top collapse (inches) | CPI |
| V * [1] | 36 | 3.1 | 29 | 20 | 7.3 | 0.6 | 34 |
| W [2] | 72 | 5.1 | 29 | 20 | 7.4 | 0.4 | 34 |
| O [1] | 73 | 4.0 | 29 | 20 | 7.6 | 0.5 | 34 |
| C [1] | 87 | 6.7 | 29 | 20 | 7.7 | 0.6 | 34 |
| Y [1] | 88 | 5.7 | 29 | 20 | 7.8 | 0.1 | 34 |
| T [1] | 125 | 9.1 | 29 | 20 | 7.4 | 0.6 | 34 |

* Shown for comparison purposes only; not a copolymer of this invention.

[1] Copolymer in solution containing 60 weight percent of the copolymer and 40 weight percent over $HO(C_2H_4O)_{19}(C_3H_6O)_{14}C_4H_9$.

[2] Copolymer in solution containing 60 weight percent of the copolymer, 36 weight percent over $HO(C_2H_4O)_{19}(C_3H_6O)_{14}C_4H_9$. and weight percent $C_9H_{19}C_6H_4(OC_2H_4)_{14.5}OH$.

The data in Table V illustrates the high potency of the novel copolymers of this invention even at low concentration.

EXAMPLE IX

This example illustrates the ability of copolymers of this invention to produce open cell polyurethane foam after prolonged storage in aqueous solution. This property is remarkable in view of the poor performance of certain allegedly hydrolytically stable, known copolymers after storage under the same conditions. The copolymers used were Copolymer M of this invention and a commercially available known copolymer (Copolymer VII). The composition of Copolymer M is shown in Example III above. Analysis of Copolymer VII indicate it to be similar to Copolymer M. However, Copolymer VII has an acetoxy endblocking group on each oxyalkylene block where a Copolymer M has methoxy endblocking groups.

Copolymer VII was used as such (100% copolymer) while Copolymer M was used in solution [the solution contained 60 weight percent of Copolymer M, 36 weight percent of $HO(C_2H_4O)_{19}(C_3H_6O)_{14}C_4H_9$ and 4 weight percent of the reaction product of one mole nonylphenol and 14.5 moles of ethylene oxide having the formula $C_9H_{49}C_6H_4(OC_2H_4)_{14.5}OH$].

Aqueous solutions of the copolymers were prepared and stored. The aqueous solutions contained:

| Material: | Grams |
|---|---|
| Copolymer VII to solution of Copolymer M | 100 |
| Distilled water | 350 |
| Triethylene diamine | 10 |
| N-ethyl morpholine | 20 |

After storage for various periods of time, portions of the aqueous solutions were used in producing flexible polyether polyurethane foams using the materials and amounts of materials set forth in Example IV above. The breathability (which is directly proportional to the amount of open cells in the foams) of the foams was measured using a standard air permeability technique. In this technique, air is forced through a 2" x 2" x 1" block of foam at a pressure differential of 0.5 inch of water. The volume of air passing through the block in a given time (standard cubic feet of air per minute) is directly proportional to the breathability (amount of open cells) in the foam. Table VI below shows the results obtained.

TABLE VI

| Storage time (hours) | Rate of flow of air through foam (standard cubic feet per minute) | |
|---|---|---|
| | Foams produced copolymer VII | Foams produced copolymer M |
| 0 | 3.6 | 4.0 |
| 2.5 | 2.8 | ---------- |
| 5 | 2.6 | ---------- |
| 17 | 2.04 | 3.8 |
| [24] | [2.19] | [41] |
| 48 | 1.6 | 4.0 |
| 72 | 1.5 | 4.5 |
| 168 | 0.76 | 4.1 |
| 336 | 0.65 | 4.3 |
| 672 | 0.18 | 3.9 |

The results in Table VI shows that prolonged storage in aqueous solutions had no effect on the performance of Copolymer M but drastically impaired the performance of Copolymer VII.

EXAMPLE X

Solvent solutions were prepared containing 60 weight percent of Copolymer M of this invention and 40 weight percent of various solvents of different molecular weights (and so different viscosities) corresponding to the formula $HO(C_2H_4O)_y(C_3H_6O)_zC_4H_9$. The weight percent of ethylene oxide units in each solvent equaled the weight percent propylene oxide in that solvent. The viscosities of the solvents and the resulting solutions are as follows:

| Solvent viscosity (centistokes at 25° C.): | Solution viscosity (centistokes at 25° C.) |
|---|---|
| 245 | 1500 |
| 96 | 1020 |
| 34 | 620 |
| 12 | 290 |

Copolymer M has a viscosity of 2510 centistokes at 25 C. The greater potency of this copolymer allows for the use of the above relatively low viscosity solutions in lieu of an equal volume of 100% solids of conventional lower potency surfactant.

The copolymers not of this invention presented in the tables above for purposes of comparison (i.e., Copolymers I to VI) are shown in the tables as represented by the generic formula in Eaxmple III for ease of comparison. Actually, these copolymers may not have the exact structure of the generic formula. This is particularly the case for Copolymer I which is within the scope of the claims of U.S. Patent 2,834,748.

What is claimed is:

1. A liquid siloxane-oxyalkylene block copolymer represented by the formula:

$$\begin{array}{c} R'O(C_3H_6O)_m(C_2H_4O)_nR \\ | \\ Me_3SiO(Me_2SiO)_x(MeSiO)_ySiMe_3 \end{array}$$

wherein R' is a monovalent hydrocarbon group containing from 1 to 10 carbon atoms, R is an alkylene group containing at least 2 carbon atoms, m and n are numbers, the sum of m+n is such that the oxyalkylene block, $R'O(C_3H_6O)_m(C_2H_4O)_n$, has a molecular weight of at least 1500, from 15 to 60 weight percent of the oxyalkylene units are oxyethylene units, x has a value of at least 40, y has a value of at least 3, the siloxane block constitutes from 15 to 70 weight percent of the block copolymer, and Me is a methyl group.

2. The block copolymer of claim 1 wherein x has a value of at least 50.

3. The block copolymer of claim 1 wherein x has a value of at least 70.

4. The block copolymer of claim 1 wherein x has a value from 50 to 200.

5. The block copolymer of claim 1 wherein x has a value from 70 to 125.

6. The block copolymer of claim 1 wherein x has a value from 70 to 150 inclusive, y has a value from 4 to 15, R contains 3 carbon atoms and R' is an alkyl group containing from 1 to 4 carbon atoms.

References Cited

The following references, cited by the Examiner, are of record in the patented file of this patent or the original patent.

UNITED STATES PATENTS

| | | | |
|---|---|---|---|
| 2,846,458 | 8/1958 | Haluska | 260—448.2 B X |
| 3,398,104 | 8/1968 | Haluska | 260—448.2 B X |
| 3,402,192 | 9/1968 | Haluska | 260—448.2 B X |

FOREIGN PATENTS

| | | | |
|---|---|---|---|
| 695,633 | 10/1964 | Canada | 260—448.2 B |
| 955,916 | 4/1964 | Great Britain | 260—448.2 B |
| 954,041 | 4/1964 | Great Britain | 260—448.2 B |
| 1,015,611 | 1/1966 | Great Britain | 260—448.2 B |

TOBIAS E. LEVOW, Primary Examiner

P. F. SHAVER, Assistant Examiner

U.S. Cl. X.R.

260—2.5 AM, 29.2 M, 33.2 SB, 33.6 SB, 46.5 Y